Dec. 22, 1959 H. SAMSON 2,917,816
HUB MEMBER FOR BICYCLE WHEELS OR THE LIKE, AND
METHOD AND APPARATUS FOR MAKING THE SAME
Filed Jan. 20, 1958 3 Sheets-Sheet 1
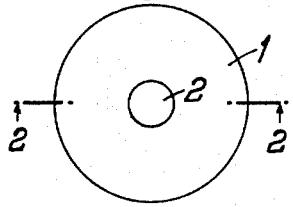
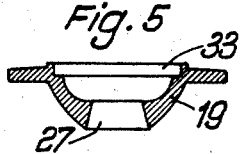
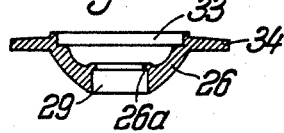
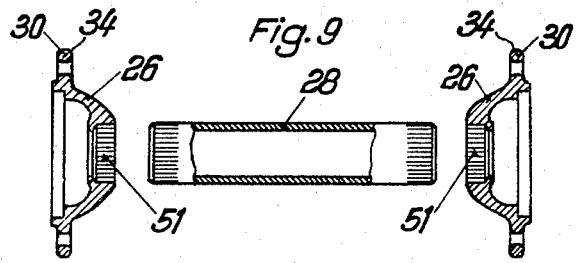
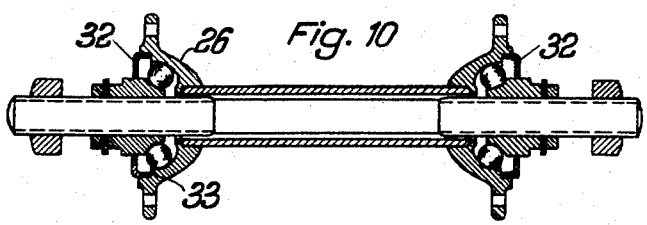
Inventor:
Helmut Samson
By Lowry & Rinehart
ATTYS.

Inventor:
Helmut Samson

Inventor:
Helmut Samson

United States Patent Office 2,917,816
Patented Dec. 22, 1959

2,917,816

HUB MEMBER FOR BICYCLE WHEELS OR THE LIKE, AND METHOD AND APPARATUS FOR MAKING THE SAME

Helmut Samson, Unna, Westphalia, Germany, assignor to Firma Union Sils Van De Loo & Co., Frondenberg (Ruhr), Germany Application January 20, 1958, Serial No. 710,063

6 Claims. (Cl. 29—159.3)

This invention relates to a dish-shaped hub member for the hubs of spoked wheels, especially bicycle wheels, and is a continuation-in-part of my application Serial No. 345,013, for Hub Structure for Bicycle Wheels and the like, and Process for Making the Same, filed March 27, 1953 and assigned unto Firm Union Sils Van de Loo & Co., Frondenberg (Ruhr), Germany, by virtue of an assignment recorded March 27, 1953, Liber 1235 page 647, now abandoned.

One of the principal objects of the present invention is to provide an efficient method of cold-flow forming under pressure dish-shaped hub members for spoked bicycle wheels or the like, from a centrally apertured steel disk, and apparatus for carrying out that method, which method and apparatus render possible the economical mass production of hub members forming as an independent unitary structure a ball bearing cup and a peripheral flange for mounting the spokes of a wheel.

Another object of the present invention is to produce hub members with a minimum of waste material and without any machining or grinding.

A further object of the present invention is to produce hub members, in which the structure of the material is so compressed that the quality of the finished hub members will be considerably higher than that of hub members produced according to conventional turning or drawing processes.

According to the invention, a centrally apertured disk-shaped blank made from steel is pressed in cold state in a first pressing operation between a first die member adapted to the internal shape of the hub member to be pre-formed, and a second die member adapted to the external shape of said hub member, the central aperture in the blank being at the same time conically widened so as to effect a thickening of the material surrounding said aperture. This thickening is produced preferably by the cone-shaped end of a pin mounted centrally in the second die member, the diameter of the central aperture in the blank and the dimensions of the cone-shaped end of the pin being so chosen as to cause the material of the blank during the pressing operation to flow radially and outwardly from the pin. In this manner those portions of the blank which are destined to form a ball race in the finished hub member will be compressed to a considerably higher degree than the rest of the hub member, which is of great importance for the quality of the ball race.

The hub member pre-formed in the first pressing operation is then subjected to a second or final pressing process in which its conically widened aperture is deformed into a substantially cylindrical aperture adapted to fit on the ends of a tubular hub member.

The invention is illustrated by way of example in the accompanying drawings in which:

Fig. 1 is a top plan view of a centrally apertured disk-shaped blank for producing a dish-shaped hub member or ball bearing cup according to the invention;

Fig. 2 is a sectional view on the line 2—2 of Fig. 1;

Fig. 5 is a sectional view of a dish-shaped hub member pre-formed from the blank in the first pressing operation;

Fig. 8 is a sectional view of the finish formed hub member after the final pressing operation;

Fig. 9 is a view, mainly in section, showing a tubular hub member and two dish-shaped hub members or ball bearing cups prior to assembly, and Fig. 10 is a sectional view of a hub structure for the front wheel of a bicycle including two ball bearing cups produced according to the invention.

Referring now more particularly to the drawings, Figs. 1 and 2 show a blank 1 in the form of a disk having a central aperture 2, said disk being preferably produced by punching from a strip of steel plate. It may, however, also be obtained by cutting from a suitable metal rod of circular cross section. In any case the quantity of material used for the blank 1 is so chosen as to correspond with the quantity of material in the finish pressed product, which in the present case is a dish-shaped hub member.

Figure 3:
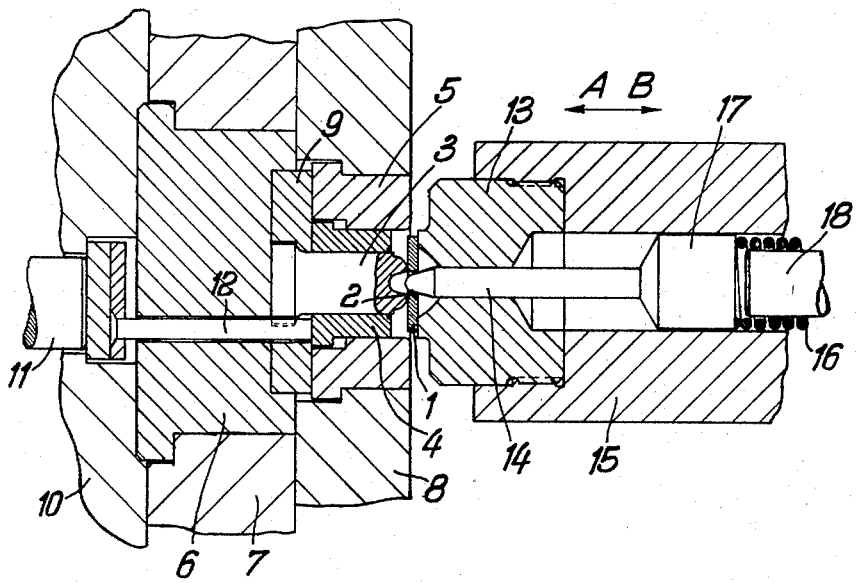
Fig. 3 is a longitudinal section through a pressing tool assembly with the blank inserted, before a first pressing operation.
Figure 4:
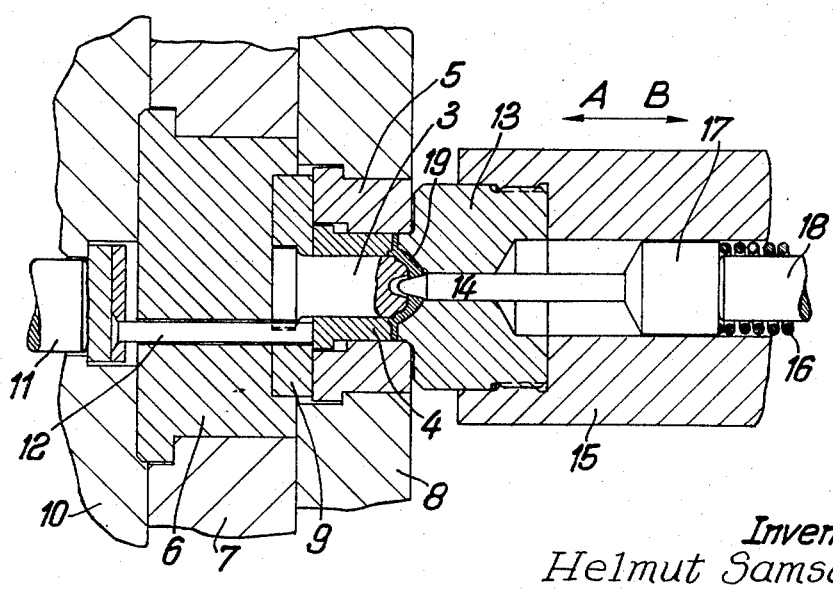
Fig. 4 is a view similar to Fig. 3 but showing the pressing tool assembly and the blank after the first pressing operation.

Each one of Figs. 3, 4, 6 and 7 illustrates an assembly of two cooperating pressing tools adapted for use in a horizontal single, double or multiple crank press of known construction which need not be described in detail. In Figs. 3 and 4 showing the tool assembly for a first pressing operation, one of the tools is arranged on a stationary member 10 of the crank press and includes a die 3, a stripper 4, a matrix 5, a pressure member or support 6, and annular members 7, 8 and 9 serving for adjustment and centering purposes. The stripper 4 is actuated by an ejector 11 through the intermediary of a pin 12. The other tool of the pressing tool assembly is mounted on a movable member of the press, such as an upsetting slide (not shown), and includes a die 13, a member 15 supporting said die 13, and a pin 14 slidable in a bore in the die 13 and the member 15. One end of the pin 14 is substantially cone-shaped and projects through the bore in the die 13, while the other end of the pin is thickened as at 17 to fit in the bore in the member 15. The thickened portion 17 of the pin 14 has a frusto-conical front face adapted to the shape of the inner end of a recess in the die 13. This recess in the die 13 is in axial alignment with the bore in the member 15. A pressure spring 16 is provided at the rear of the thickened portion 17 and, as the member 15 carrying the die 13 is moved in the direction of the arrow B to a rearward position away from the die 3, pushes the pin 14 ahead until the front face of its thickened portion 17 engages the inner end of the recess in the die 13.

In this position of the pressing tool asembly the blank 1 is introduced therein by means of an automatic feeding device not shown in the drawings. By this feeding device, magnetic or other conventional means such as tongs or the like, the blank 1 is held in front of the die 3 until the conical end of the pin 14 engages in the central aperture 2 of the blank 1 and presses the latter against the die 3 when the member 15 is moved by the upsetting slide of the press in the direction of the arrow A. The means for introducing and/or holding the blank 1 are now withdrawn therefrom to a position clear of the pressing tools.

Fig. 3 illustrates the relative position of the tools at the commencement of the first cold flowing pressing operation. During this pressing operation the die 13 is first moved to press the blank 1 over the die 3 while the pin 14 does not participate in this movement until its thickened portion 17 is engaged by a ram 18 urging the conical end of the pin 14 into the central aperture 2, thereby widening the latter to form a conical aperture 27 (Fig. 5) shaped in conformity with the cone-shaped end of pin 14. The diameter of the central aperture 2 and the dimensions of the cone-shaped end of the pin 14 are so chosen as to cause the material of the blank 1 during the pressing operation to flow radially outwardly from the pin 14 with the result that the structure of the material at those parts of the blank which are destined to form a ball race in the finished hub member will be compressed to a much higher degree and thus become considerably more dense than that of the rest of the hub member.

Fig. 4 shows the relative position of the tools at the end of the first pressing operation in which the blank 1 has been formed into a pre-shaped hub member 19. When opening the pressing tool assembly the pre-shaped hub member 19 will be removed from the matrix 5 with the aid of the stripper 4 which is automatically actuated by the ejector 11 through the intermediary of the pin 12. The pressing tool assembly is then ready for the reception of a fresh blank 1.

The arrangement for the actuation of the stripper 4 by the ejector 11 may be such that said ejector is cooperatively connected with the supporting member 15 by means of metal rods or strips so that it automatically follows the member 15 in either direction of movement thereof.

Figure 6:
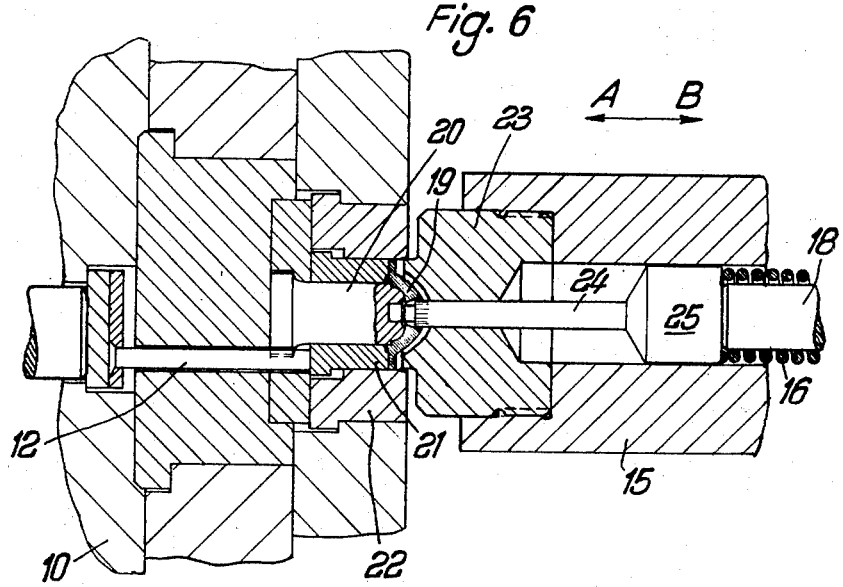
Fig. 6 is a longitudinal section of another pressing tool assembly with the preformed hub member of Fig. 5 inserted therein before a second or final pressing operation.
Figure 7:
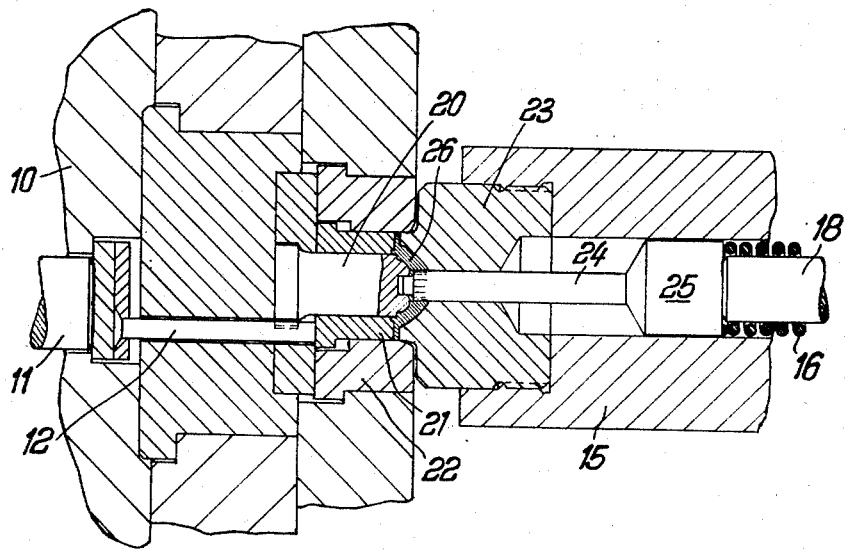
Fig. 7 is a view similar to Fig. 6 but showing the pressing tool assembly and the dish-shaped hub member after the final pressing operation.

The pre-shaped hub member 19, which is shown more clearly in Fig. 5, will then be given its final shape in a second pressing operation as illustrated in Figs. 6 and 7. For this second or final pressing operation the press will be the same or of the same type as that employed in the first pressing operation while some preferably removable parts of the pressing tools will be replaced by other parts adapted to the final shape of the hub member to be produced. These substitute parts are a die 20, a stripper 21 and a matrix 22, all arranged on the stationary member 10 of the press, and further a die 23 and a pin 24 on the movable member of the press.

The individual steps of the final pressing operation correspond substantially with those of the first pressing operation. Accordingly the pre-shaped hub member 19 is introduced in the pressing tool assembly and, upon inward movement of the upsetting slide, the end of the pin 24 engages in the conical aperture 27 and urges the hub member 19 against the die 20. The pin 24, which is acted upon by the pressure spring 16, will not participate in the movement of the die 23 until the ram 18 engages the pin 24 at its thickened end portion 25. This position is illustrated in Fig. 6. Upon further inward movement of the upsetting slide and its tool the suitably shaped end of the pin 24 deforms the conical aperture 27 of the pre-shaped hub member 19 into a substantially cylindrical aperture 29 with an annular flange 26a at the inner end thereof, as shown in Figs. 8. At the same time, the outer shape of the hub member is re-pressed by the die 23. The aperture 27 is shaped to fit tightly on the ends of a tubular hub member 28 on which the dish-shaped hub members are destined to be mounted, the annular flange 26a of the aperture 29 serving as stop to prevent the dish-shaped hub member from moving inwardly on the tubular hub member 28.

Although a metal will generally be used for the tubular member and opposite dish-shaped hub members, it is also possible to connect the opposite dish-shaped hub members to the tubular member with the aid of a self-hardening synthetic material.

Fig. 7 illustrates the closed position of the tool assembly in the final pressing operation, while Fig. 8 shows in greater detail a dish-shaped hub member 26 finish formed during the final cold flowing pressing operation.

When opening the pressing tool assembly the finish formed hub member 26 is removed therefrom with the aid of the stripper 21 actuated by the ejector 11 through the intermediary of the pin 12.

Thereafter, the annular rim portion 34 formed on the outer periphery of the hub member 26 is provided with a plurality of suitably spaced openings 30 adapted to receive the spokes of a bicycle wheel with which the hub member is to be used. After the thus prepared hub members 26 have been subjected to any known hardening process, they may be press fitted on the ends of the tubular hub member 28. In order to prevent any rotation of the dish-shaped hub members 26 with respect to the tubular hub member 28, the apertures 29 are preferably formed with axially extending serrations or grooves 31. Accordingly the ends of the tubular hub member 28 may be provided with corresponding grooves formed therein prior to assembly of the parts.

Fig. 10 shows in assembled state a hub structure for the front wheel of a bicycle with dish-shaped hub members or ball bearing cups produced according to the invention. Each dish-shaped hub member 26 is sealed from the outer side by a dust cover or sealing member 32 which is inserted in an annular offset portion 33 formed in the hub member 26 during the cold flowing pressing operations.

While the method herein described, and the apparatus used for carrying out this method into effect constitute preferred embodiments of the invention, it is to be understood that the invention is not limited to this precise method and apparatus, and that changes may be made in either without departing from the scope of the invention which is defined in the appended claims.

I claim:

1. A method of cold flow forming under pressure dish-shaped hub members for spoked bicycle wheels or the like, said hub members forming as an independent unitary structure a ball bearing cup and a peripheral flange for mounting the spokes of a wheel, comprising the steps of blanking a circular steel disk with a central aperture, pre-pressing said disk in cold state between a first die member adapted to the internal shape of the hub member to be pre-formed and a second die member adapted to the external shape of said hub member, and simultaneously widening said central aperture into a conical aperture so that predetermined portions of the finished hub member adjacent the aperture are thicker than the disk while predetermined other portions of the hub member adjacent the outer periphery thereof are thinner and the material thereof has a more dense structure than that of the disk.

2. A method as set forth in claim 1, comprising the further steps of re-shaping the pre-formed hub member in cold state by re-pressing between a first die member adapted to the internal shape of the finished hub member and a second die member adapted to the external shape of the finished hub member, and simultaneously deforming said conical aperture into a substantially cylindrical aperture adapted to fit on the ends of a tubular hub member.

3. A method of making a complete hub structure for the spoked wheel of a bicycle or the like from a single annular disk, comprising the steps of blanking an annular disk with a central opening of a given diameter; cold-flow pressing said disk in a die to a substantially dish-shaped part; and simultaneously pressing a conical pin of a major diameter larger than said given diameter through said opening whereby said opening is expanded into a frusto-conical opening and whereby the metal is displaced by the pin and flows about said pin to form a portion in said part adjacent said opening which is thicker than the rest of the disk.

4. A method of making a complete hub structure for the spoked wheel of a bicycle or the like from a single annular disk, comprising the steps of blanking an annular disk with a central opening of a given diameter; pressing said disk in a die to a substantially dish-shaped part; simultaneously pressing a conical pin of a major diameter larger than said given diameter through said opening whereby said opening is expanded into a frusto-conical opening and whereby the metal is displaced by the pin and flows about said pin to form a portion in said part adjacent said opening which is thicker than said disk; and finish pressing the thus formed part to form said conical opening into a cylindrical opening with serrations in axial direction.

5. A method of making the hub structure of the spoked wheel of the bicycle or the like, comprising the steps of blanking a pair of annular disks each with the central opening of a given diameter; pressing said disks in a die to two substantially dish-shaped parts; simultaneously pressing a pair of conical pins having each a major diameter larger than said given diameter respectively through said openings whereby said openings are expanded into frusto-conical openings and whereby the metal is displaced by said pins and flows about said pins to form a portion in each of said parts adjacent said opening which is thicker than said disks; finish pressing the thus formed parts to form said conical openings respectively into cylindrical openings each having serrations in axial direction; and pressing said dish-shaped parts respectively onto opposite end portions of a tubular member.

6. A method of cold-flow forming a complete hub structure having an axially displaced thick hub portion surrounded by a thin annular spoke portion from a single apertured disk having an inner aperture-surrounding portion and an outer rim portion, comprising the simultaneous steps of axially displacing said aperture-surrounding portion of said disk into a die cavity of desired shape while enlarging said aperture about an outwardly tapering conical pin in said cavity to cause flow of material radially and outwardly from said pin, compressing said outer rim portion of said disk while containing said disk peripherally to cause flow of material toward said pin, and compacting said flowing material against the walls of the pin and of the cavity, whereby a hub structure having an axially displaced thick hub portion surrounded by a thin annular spoke portion is formed.

References Cited in the file of this patent

UNITED STATES PATENTS

| | | |
|---|---|---|
| 1,007,945 | Hansen | Nov. 7, 1911 |
| 1,149,267 | Keithley | Aug. 10, 1915 |
| 1,433,819 | Heyman | Oct. 31, 1922 |
| 1,703,714 | Booth | Feb. 26, 1929 |
| 1,895,401 | Simonsen et al. | Jan. 24, 1933 |
| 2,003,438 | Guignet | June 4, 1935 |
| 2,014,605 | Zimmerman | Sept. 17, 1935 |
| 2,738,575 | Swain | Mar. 20, 1956 |

FOREIGN PATENTS

| | | |
|---|---|---|
| 10,686 | Great Britain | A.D. 1902 |
| 8,600 | Great Britain | A.D. 1908 |
| 320,276 | Great Britain | Oct. 10, 1929 |
| 899,936 | France | June 14, 1945 |
| 718,076 | Great Britain | Nov. 10, 1954 |